Patented Apr. 17, 1923.

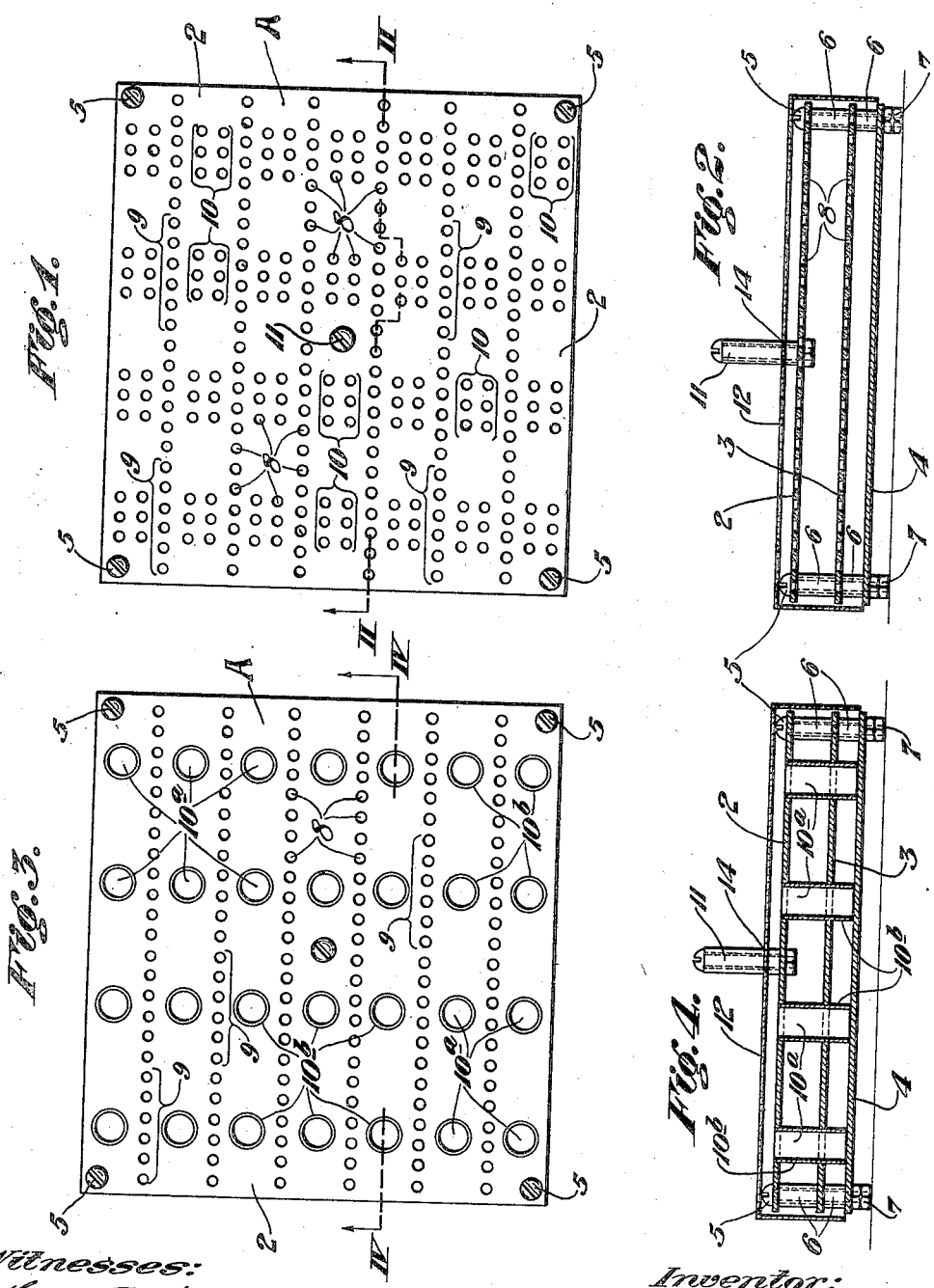

1,451,806

UNITED STATES PATENT OFFICE.

JOSEPH E. BALDRIDGE, OF AVALON, PENNSYLVANIA.

DENTAL TOOL HOLDER.

Application filed May 26, 1922. Serial No. 563,927.

*To all whom it may concern:*

Be it known that I, JOSEPH E. BALD-RIDGE, a citizen of the United States, and resident of Avalon, in the county of Allegheny and State of Pennsylvania, have invented certain new and useful Improvements in Dental Tool Holders, of which the following is a specification.

This invention relates to tool holders for holding small tools such as used by dentists, and more particularly to a holder for dental burrs.

One object of the invention is the provision of a holder of the class described having means for holding new and used tools in selective groups in such a manner that they are readily distinguishable from each other.

Another object is to provide a tool holder that is constructed throughout of material that will withstand the high temperature produced in sterilizing.

A further object is to provide a tool holder having the novel features, design, construction and combination of parts described in the following specification and illustrated in the accompanying drawings.

Dental burrs are purchased in packages of six burrs, and these burrs have a very short life, it being necessary to use several burrs in the preparation of a single tooth for filling. The used burrs, if not too badly worn, are resharpened and used for removing the center of the tooth, which is comparatively soft, and also for grinding out old fillings.

Heretofore dentists have had no holders arranged for holding the burrs in selective groups. As a rule they either have a block with a plurality of holes therein in which the burrs are inserted at random, or else they are merely thrown loose in one of the drawers of his cabinet.

The present tool holder provides for the orderly arrangement of burrs and also provides means for keeping the used and unused burrs in separate groups readily available to the operator.

In the drawings—Figure 1 is a plan view of a tool holder constructed in accordance with this invention.

Figure 2 is a sectional elevation on the line II—II of Figure 1.

Figure 3 is a plan view of a modified form of tool holder.

Figure 4 is a sectional elevation on the line IV—IV of Figure 3.

Referring more particularly to the drawings, the letter A designates the block as a whole, which is composed of three rectangular plates 2, 3, and 4, respectively, spaced on bolts 5 at each corner by spacers 6 and locked in position by nuts 7 screwed on the lower ends of the bolts 5. The nuts also serve as feet or supports for the block.

The top plate 2 and intermediate plate 3 are provided with a plurality of alined apertures 8 which apertures are arranged in groups of six. One series of groups designated by the numeral 9 have their apertures arranged in a single row while the other series of groups designated by the numeral 10 have their apertures arranged in double rows of three apertures each. The groups 9 composed of a single row of apertures are adapted to receive new or unused burrs, which as stated before are received in packages of six, and, therefore, each of the groups of apertures 9 will hold a complete package of burrs. The groups 10 composed of double rows of apertures are arranged alongside of the groups 9 and are adapted to receive the burrs from the groups 9 as they are used.

The burrs extend through the apertures 8 in both of the plates 2 and 3 and rest or stop against the bottom or stop plate 4.

A handle 11 is secured to the center of the top plate 2 and extends upwardly therefrom to facilitate the handling of the holder.

A cover member 12 is provided to fit over the block A, and has an aperture 14 therein to permit the passage of the handle 11 therethrough.

This holder is preferably made of metal, glass, porcelain, or the like so as to be readily sterilizable.

In Figures 3 and 4, I have shown a slightly modified form of burr holder in which the groups 10 of apertures are omitted and a single large aperture $10^a$ is substituted therefor. The aperture $10^a$ extends through the upper plate 2 and intermediate plate 3, and has a tubular lining member $10^b$ inserted therein to form a closed receptacle for used burrs from the groups 9. The member $10^b$ is of sufficient size to receive at least six burrs.

The operation and many advantages of my tool holder will be readily understood by those skilled in the art.

I claim—

1. A sterilizable dental tool holder comprising in combination, a block composed of a plurality of parallel plates spaced one above the other, some of said plates being provided with a plurality of groups of apertures for the reception of tools, the bottom plate being unapertured to form a stop for said tools, a centrally arranged handle extending upwardly from the top plate, supporting feet extending below the bottom plate, and a cover member adapted to fit over said block and provided with a suitable aperture through which said handle projects when said cover member is in place.

2. A sterilizable dental tool holder comprising in combination, a block composed of three parallel plates spaced one above the other, the two uppermost plates being provided with a plurality of alined apertures, and the lowermost plate being unapertured to form a stop for the tools, some of the apertures in said two uppermost plates being arranged in single row groups for the reception of new and unused tools, and the remaining apertures being arranged in double row groups alongside of each of said single row groups, said double row groups being adapted to receive the used tools from said single row groups, a centrally arranged handle extending upwardly from the top plate, and a cover member adapted to fit over said block and provided with a suitable aperture through which said handle projects when said cover member is in place.

3. A dental burr holder comprising a sterilizable block having a plurality of small apertures arranged in single row groups for the reception of unused dental burrs, said apertures being of such size as to snugly engage the shank of the burrs, and a single large aperture along side of each of said groups of small apertures adapted to receive the used burrs taken from said small apertures, said large apertures being of such size that each will receive all the burrs from one group of the small apertures.

In testimony whereof I have hereunto signed my name.

JOSEPH E. BALDRIDGE.